United States Patent

[11] 3,573,882

[72] Inventor Friedrich H. Van Winsen
 Kirchheim Teck, Germany
[21] Appl. No. 753,284
[22] Filed Aug. 16, 1968
[45] Patented Apr. 6, 1971
[73] Assignee Daimler-Benz Aktiengesellschaft
 Stuttgart-Unterturkheim, Germany
[32] Priority Aug. 16, 1967
[33] Germany
[31] P 16 30 340.5

[54] AXLE SUSPENSION, ESPECIALLY FOR THE REAR AXLE OF MOTOR VEHICLES
 16 Claims, 3 Drawing Figs.
[52] U.S. Cl. ..................................... 280/124,
 180/73
[51] Int. Cl. ...................................... B60g 3/00
[50] Field of Search........................................ 180/73,
 73(D); 280/124, 124.1

[56] References Cited
UNITED STATES PATENTS
| | | | |
|---|---|---|---|
| 2,226,047 | 12/1940 | Borgward..................... | 180/73 |
| 3,174,771 | 3/1965 | Muller......................... | 180/73X |
| 3,277,975 | 10/1966 | Van Winsen................. | 180/73 |

Primary Examiner—A. Harry Levy
Attorney—Craig, Antonelli, Stewart & Hill

ABSTRACT: An axle suspension, especially for the rear axle of motor vehicles in which two oppositely directed longitudinal guide members are pivotally connected with the wheel carrier serving as coupler member while a brake stator is pivotally supported on the forwardly extending guide member; the free ends of the longitudinal guide members are so pivotally connected at the vehicle superstructure that the straight lines extending through their joint axes intersect to the rear of the rear axle, and preferably at a point located to the rear thereof by at least one wheel diameter.

PATENTED APR 6 1971
3,573,882
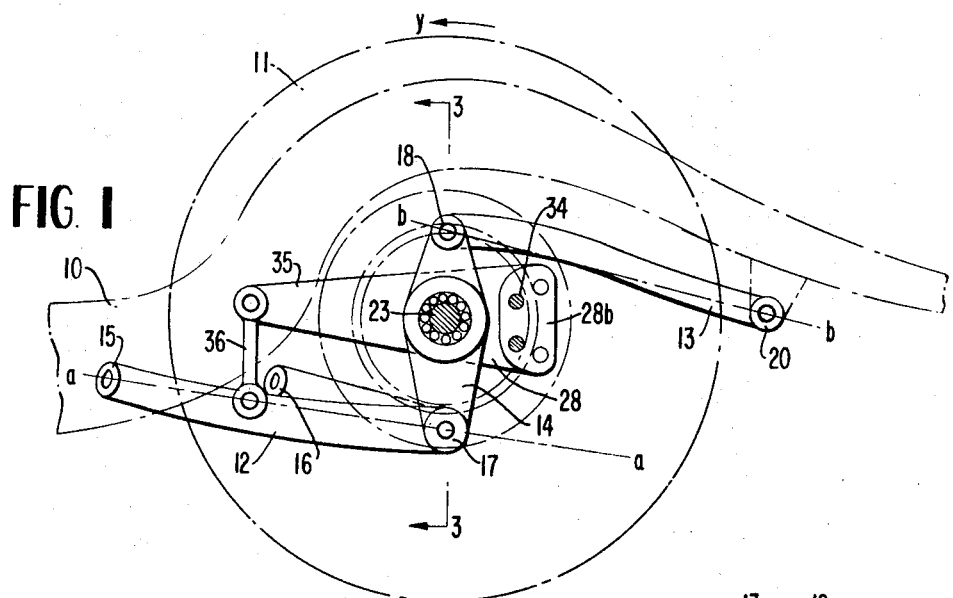
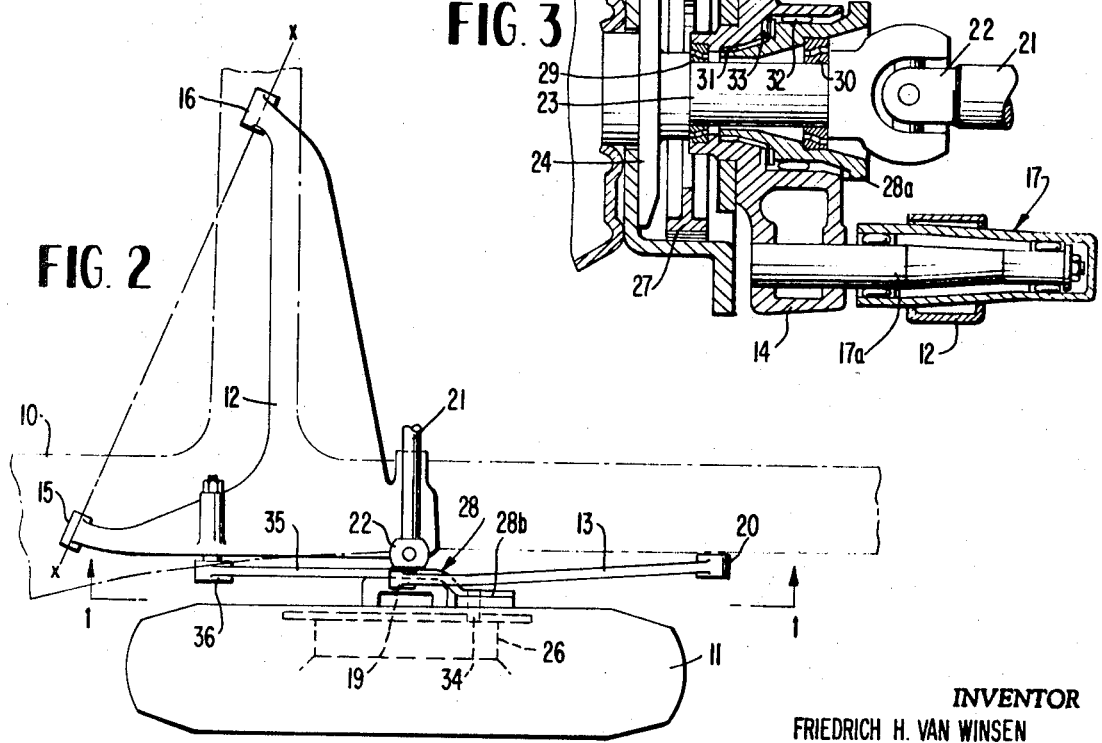
INVENTOR
FRIEDRICH H. VAN WINSEN
BY Craig & Antonelli
ATTORNEYS

AXLE SUSPENSION, ESPECIALLY FOR THE REAR AXLE OF MOTOR VEHICLES

The present invention relates to an axle suspension in vehicles, especially for the rear axle of motor vehicles, which includes a longitudinal wheel guide member, preferably a lower longitudinal wheel guide member pivotally connected to the wheel carrier eccentrically to the wheel axle center and directed forwardly from the wheel carrier, and for the purpose of equalization of the brake pitching, a brake stator pivotally connected to the wheel carrier and supported on the longitudinal wheel guide member by means of a connecting member.

With a known axle suspension of this type having swinging half-axles pivoting about vehicle longitudinal axes, the brake stator is pivotally supported in each case by way of a connecting member on the lower longitudinal guide member which is provided alone for the support of a swinging half-axle in the thrust direction. Even though the brake pitching can be reduced or eliminated in such prior art construction, a starting equalization, i.e., an elimination of the starting dive movements of the vehicle occurring during the sudden starting of the vehicle, is not possible.

It is the aim of the present invention to eliminate this disadvantage either entirely or partly. Accordingly, the present invention essentially consists in that the wheel carrier is guided as coupler between the aforementioned longitudinal guide member serving for the support of the brake stator and a further, preferably upper longitudinal guide member which is oppositely directed from the wheel carrier, and in that for the equalization of the starting dive the further longitudinal guide member is directed obliquely to the first-mentioned guide member in such a manner that, as viewed in side view of the vehicle, the center lines of the two longitudinal guide members extending through the respective joints thereof intersect at a point to the rear of the axle in the center spring position of the vehicle. Preferably, these center lines are each inclined rearwardly downwardly and intersect in a point which is located to the rear of the wheel center axis by at least one wheel diameter, preferably, however, is located to the rear of the wheel center axis by a greater distance, and possibly may also be located at infinity with parallelly extending center lines.

In contradistinction to the axle suspensions known heretofore in which either only the brake pitching or the start diving could be eliminated or one effect could be improved to the detriment of the other, both the brake pitching as well as the start diving can be simultaneously avoided by the present invention.

Accordingly, it is an object of the present invention to provide an axle suspension, especially for the rear axle of motor vehicles which avoids by simple means the aforementioned shortcomings and drawbacks encountered in the prior art.

Another object of the present invention resides in an axle suspension of the type described above which enables the simultaneous elimination of the pitching movements caused both by sudden decelerations and sudden accelerations of the vehicle.

These and further objects, features and advantages of the present invention will become more obvious from the following description when taken in connection with the accompanying drawing which shows, for purposes of illustration only, one embodiment of an axle suspension in accordance with the present invention, and wherein:

FIG. 1 is a schematic side elevational view of an axle suspension in accordance with the present invention, taken along line 1–1 of FIG. 2;

FIG. 2 is a plan view on the axle suspension of FIG. 1; and

FIG. 3 is a partial cross-sectional view taken along line 3–3 of FIG. 1 and illustrating, on an enlarged scale, the constructional details of the axle suspension of the present invention.

Referring now to the drawing wherein like reference numerals are used throughout the various views to designate like parts and more particularly to FIGS. 1 and 2, reference numeral 10 designates a conventional vehicle superstructure, for example, of a passenger motor vehicle which is indicated in dash and dot lines. The rear wheels 11 are suspended at the vehicle superstructure 10 independently of one another by means of a lower longitudinal guide member 12 and an upper longitudinal guide member 13. The two longitudinal guide members 12 and 13 are pivotally connected with each other by means of a wheel carrier 14 acting as coupler element. The lower guide member 12 is constructed as forklike, inclined guide element (FIG. 2) and is pivotally supported by means of joints 15 and 16 about the axis $x-x$ which may be disposed either horizontally or also at an inclination to the horizontal. The lower guide member 12 is connected with the wheel carrier 14 by means of a joint generally designated by reference numeral 17. For example, a joint pin 17a serves for this purpose which, as illustrated in FIG. 3, is securely anchored in the wheel carrier 14 and on which the inclined guide member 12 is supported, axially secured by means of roller bearings. Elastic or rubber bushings are preferably interposed in the joints 15 and 16 for the elastic bearing support of the inclined guide member 12.

At one end thereof, the upper guide member 13 is pivotally connected at the wheel carrier 14 by a joint generally designated by reference numeral 18 which is spaced at a smaller distance from the wheel center axis than the joint 17 of the lower guide member 12 and thereby enables a low type of construction of the vehicle rear section, by means of a joint bolt or pin 18a and preferably under interposition of a ring-shaped rubber cushion 19; at its other end, the upper guide member 13 is pivotally connected at the vehicle superstructure 10 by means of a conventional joint 20. The upper guide members 13, disposed mutually opposite on the two vehicle sides, can be connected with each other by a torsion rod serving as stabilizer which is disposed in the axis of the joint 20 and which may simultaneously also form the guide members 13.

The vehicle is driven from a driving engine (not shown) arranged, for example, in the usual manner at the front end of the vehicle which drives, the wheel axle shafts 23, for example, by way of a cardan shaft and of a differential gear disposed between the rear wheels, the joint shafts 21 as well as by means of the latter and suitably constructed drive joints 22. The wheel 25 as well as a brake drum 26 are rigidly connected in a conventional manner with the flange 24 of the wheel axle shaft 23. The wheel carrier 14 is rotatably supported on the wheel axle shaft 23 by means of roller bearings in a manner to be described more fully hereinafter.

The brake shoes 27 are carried by a brake stator 28, whose hub 28a is axially inserted between the axle shaft 23 and the wheel carrier 14 and is rotatably supported both relative to the wheel axle shaft 23 as also to the wheel carrier 14. For example, the tapered or conical roller bearings 29 and 30, the needle bearings 31 and 32, and the axial thrust ball bearing 33 serve for the common support of the brake stator 28 and of the wheel carrier 14 on the wheel axle shaft 23. On the rear side of the wheel carrier 14, the hub 28a of the brake stator 28 is connected with a brake support 28b thereof which carries the brake shoes 27, for example, by means of bolts 34 or the like. On the side opposite the brake support 28b, the brake stator 28 is provided with a forwardly extending support arm 35 which is pivotally supported on the lower guide member 12 by means of a guide element 36.

As shown in FIG. 1, the straight line $a-a$ between the joints 15 and 17 forming the guide centerline of the lower guide member 12 as well as the straight line $b-b$ between the joints 18 and 20 forming the guide centerline of the upper guide member 13 are inclined rearwardly downwardly, and more particularly in such a manner that the point of intersection of the two straight lines is located to the rear of the rear axle and lower than the wheel center. The following is achieved thereby:

If the vehicle is braked, then by reason of the mass inertia of the vehicle, the wheel 11 seeks to continue to rotate in the direction of arrow $y$ (FIG. 1) and to take along the brake stator 28 in this direction. Consequently, the support arm 35 exerts pressure by way of the guide element 36 upon the lower guide member 12 which is supported at 17 and thereby seeks to pull the vehicle superstructure 10 downwardly in the joints 15 and 16 which counteracts the lifting of the vehicle rear section and therewith the brake pitching.

If the vehicle is accelerated by a sudden starting, then in cooperation with the mass inertia of the vehicle, a reaction torque occurs in the rear axle drive which with the usual conventional constructions having forwardly supported longitudinal guide members, seeks to cause the wheel and superstructure to approach one another. By the arrangement according to the present invention of the lower and upper guide members 12 and 13 with a point of intersection of the straight lines a–a and b–b disposed to the rear of the rear axle, it is achieved, however, that already in the center, starting position of the vehicle superstructure relative to the wheel a starting equalization is achieved which is 100 percent or even thereabove, if so desired.

The vehicle spring system can be constructed in any conventional, suitable manner. For example, for this purpose, coil springs, rubber springs, pneumatic springs or the like may be provided therefor which are interconnected between the lower guide member 12 and the vehicle superstructure.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of such persons skilled in the art.

I claim:

1. An axle suspension in vehicles, especially for the rear axle of motor vehicles, which includes one longitudinal wheel guide means pivotally connected at a wheel carrier means eccentrically of the wheel axis and brake stator means, for the equalization of the brake pitching, pivotally supported on the wheel carrier means and supported on the one longitudinal guide means by way of a connecting means, characterized in that the wheel carrier means is guided as coupler means between said one longitudinal guide means and another, oppositely directed longitudinal guide means, said other guide means being inclined as viewed in side view of the vehicle, to said one guide means for the purpose of the equalization of the starting dive movements in such a manner that the centerlines of the two guide means extending through respective joint means thereof intersect each other, in the spring center position of the vehicle, at a point located to the rear of the axle.

2. An axle suspension according to claim 1, wherein the centerlines of the two longitudinal guide means are both inclined rearwardly downwardly in the spring center position of the vehicle.

3. An axle suspension according to claim 2, wherein the point of intersection of said centerlines is located to the rear of the wheel center axis by at least one wheel diameter.

4. An axle suspension according to claim 2, wherein said one longitudinal guide means is a lower forwardly directed guide member and said other longitudinal guide means is an upper rearwardly directed guide member.

5. An axle suspension according to claim 4, wherein the joint means of the lower longitudinal guide means at the wheel carrier means has a larger distance from the wheel center axis than the corresponding joint means of the upper longitudinal guide means.

6. An axle suspension according to claim 5, wherein the longitudinal guide means serving for the support of the brake stator means is constructed as inclined guide element.

7. An axle suspension according to claim 4, wherein said one longitudinal guide means is an inclined guide element pivotal about an axis extending an angle to the longitudinal and transverse vehicle directions.

8. An axle suspension according to claim 7, wherein the longitudinal guide means serving for the support of the brake stator means is constructed as inclined guide element.

9. An axle suspension according to claim 1, wherein the point of intersection of said centerlines is located to the rear of the wheel center axis by at least one wheel diameter.

10. An axle suspension according to claim 1, wherein the two longitudinal guide means constitute an upper and a lower longitudinal guide means, and the joint means of the lower longitudinal guide means at the wheel carrier means has a larger distance from the wheel center axis than the corresponding joint means of the upper longitudinal guide means.

11. An axle suspension according to claim 1, wherein said one longitudinal guide means is a lower forwardly directed guide member and said other longitudinal guide means is an upper rearwardly directed guide member.

12. An axle suspension according to claim 11, wherein said one longitudinal guide means is an inclined guide element pivotal about an axis extending an angle to the longitudinal and transverse vehicle directions.

13. An axle suspension according to claim 11, wherein the center lines of the two longitudinal guide means are both inclined rearwardly downwardly in the spring center position of the vehicle.

14. An axle suspension according to claim 11, wherein the longitudinal guide means serving for the support of the brake stator means is constructed as inclined guide element.

15. An axle suspension in vehicles, especially for the rear axle of motor vehicles, which includes one longitudinal wheel guide means pivotally connected at a wheel carrier means eccentrically of the wheel axis and brake stator means, for the equalization of the brake pitching, pivotally supported on the wheel carrier means and supported on the one longitudinal guide means by way of a connecting means, characterized in that the wheel carrier means is guided as coupler means between said one longitudinal guide means and another, oppositely directed longitudinal guide means, said other guide means being inclined, as viewed in side view of the vehicle, to said one guide means for the purpose of the equalization of the starting dive movements in such a manner that the centerlines of the two guide means, which are both inclined rearwardly downwardly in the spring center position of the vehicle and extend through respective joint means thereof, intersect each other, in the spring center position of the vehicle, at a point located rearwardly of the rear axle.

16. An axle suspension in vehicles, especially for the rear axle of motor vehicles, which includes one longitudinal wheel guide means pivotally connected at a wheel carrier means eccentrically of the wheel axis and brake stator means, for the equalization of the brake pitching, pivotally supported on the wheel carrier means and supported on the one longitudinal guide means by way of a connecting means, characterized in that the wheel carrier means is guided as coupler means between said one longitudinal guide means and another, oppositely directed longitudinal guide means, said other guide means being inclined, as viewed in side view of the vehicle, to said one guide means for the purpose of the equalization of the starting dive movements in such a manner that the centerlines of the two guide means extending through respective joint means thereof intersect each other, in the spring center position of the vehicle, at a point located rearwardly of the rear axle.